(12) United States Patent
Qi

(10) Patent No.: US 11,206,509 B2
(45) Date of Patent: Dec. 21, 2021

(54) METHOD AND APPARATUS FOR MEASURING A POSITION IN A WIRELESS COMMUNICATION NETWORK

(71) Applicant: Samsung Electronics Co., Ltd., Suwon-si (KR)

(72) Inventor: Yinan Qi, Staines (GB)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/861,826

(22) Filed: Apr. 29, 2020

(65) Prior Publication Data

US 2020/0351618 A1   Nov. 5, 2020

(30) Foreign Application Priority Data

May 2, 2019 (GB) .................................. 1906205
Apr. 28, 2020 (KR) ...................... 10-2020-0051838

(51) Int. Cl.
*H04W 4/029* (2018.01)
*G01S 5/00* (2006.01)

(52) U.S. Cl.
CPC ........... *H04W 4/029* (2018.02); *G01S 5/0045* (2013.01)

(58) Field of Classification Search
CPC ............................. H04W 4/029; G01S 5/0045
See application file for complete search history.

(56) References Cited

U.S. PATENT DOCUMENTS

| | | | |
|---|---|---|---|
| 2011/0081933 A1 | 4/2011 | Suh et al. | |
| 2014/0073356 A1* | 3/2014 | Siomina | G01S 5/0205 455/456.2 |
| 2016/0223639 A1* | 8/2016 | Davydov | H04W 64/00 |
| 2018/0048444 A1* | 2/2018 | Park | H04L 5/0048 |
| 2018/0098314 A1 | 4/2018 | Rico Alvarino et al. | |
| 2018/0167775 A1* | 6/2018 | Tian | H04W 64/003 |
| 2019/0037338 A1* | 1/2019 | Edge | H04W 4/02 |
| 2019/0052996 A1* | 2/2019 | Sahai | H04W 36/0088 |
| 2019/0178976 A1* | 6/2019 | Xiong | H04B 1/713 |
| 2020/0021946 A1* | 1/2020 | Kumar | H04W 64/006 |
| 2020/0107286 A1* | 4/2020 | Akkarakaran | H04L 41/08 |
| 2020/0127785 A1 | 4/2020 | Blankenship et al. | |
| 2020/0228381 A1* | 7/2020 | Manolakos | H04L 27/2665 |

(Continued)

FOREIGN PATENT DOCUMENTS

| | | |
|---|---|---|
| EP | 3 282 784 A1 | 2/2018 |
| KR | 10-2017-0131554 A | 11/2017 |

OTHER PUBLICATIONS

Vivo, 'Discussion on DL RS for NR positioning', R1-1906177, 3GPP TSG RAN WG1 #97, Reno, USA, May 1, 2019.

(Continued)

*Primary Examiner* — Barry W Taylor
(74) *Attorney, Agent, or Firm* — Jefferson IP Law, LLP

(57) ABSTRACT

A method and an apparatus of measuring a position of user equipment (UE) in a wireless communication network are provided. The method includes receiving, from a base station, positioning reference signal (PRS) configuration information including information about at least one PRS resource set including at least one PRS resource for receiving a PRS, receiving, from the base station, the PRS based on the PRS configuration information, and performing position measurement of the UE based on the received PRS.

12 Claims, 8 Drawing Sheets

(56) References Cited

U.S. PATENT DOCUMENTS

2020/0235877 A1* 7/2020 Manolakos ............ H04W 4/029
2020/0236644 A1* 7/2020 Gunnarsson .......... H04W 64/00
2021/0076359 A1* 3/2021 Sosnin .................. H04W 72/10
2021/0185632 A1* 6/2021 Manolakos ............ H04W 72/06

OTHER PUBLICATIONS

Catt, 'NR Positioning Reference Signals for OTDOA', R1-1812616, 3GPP TSG RAN WG1 Meeting #95, Spokane, USA, Nov. 3, 2018.
Intel Corporation, 'Offline Discussion Outcome on DL Reference Signals for NR Positioning', R1-1905847, 3GPP TSG RAN WG1 Meeting #96bis, Xi'an, China, Apr. 15, 2019.
International Search Report dated Aug. 7, 2020 issued in International Patent Application No. PCT/KR2020/005662.
Mediatek, Reference Signal Design for NR Positioning, R1-1904500; 3GPP TSG-RAN WG1 #96bis Meeting; Agenda item: 7.2.10.1; Apr. 12, 2019, Xi'an, China.
Great Britain Search Report dated Oct. 4, 2019, issued in a counterpart GB Application No. GB1906205.8.

* cited by examiner

METHOD AND APPARATUS FOR MEASURING A POSITION IN A WIRELESS COMMUNICATION NETWORK

CROSS-REFERENCE TO RELATED APPLICATION(S)

This application is based on and claims priority under 35 U.S.C. § 119(a) of a United Kingdom patent application number 1906205.8, filed on May 2, 2019, in the United Kingdom Intellectual Property Office, and of a Korean patent application number 10-2020-0051838, filed on Apr. 28, 2020, in the Korean Intellectual Property Office, the disclosures of each of which is incorporated by reference herein in its entirety.

BACKGROUND

1. Field

The disclosure relates to improvements is the provision, management and interpretation of a positioning reference signal (PRS) in a telecommunication system and apparatus associated therewith. More particularly, the disclosure relates to New Radio (NR) or Fifth Generation (5G) systems, but may have other applications.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 gigahertz (GHz) bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies, such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and apparatus of measuring a position of user equipment (UE) in a wireless communication network.

Additional aspects will be set forth in part in the description which follows and, in part, will be apparent from the description, or may be learned by practice of the presented embodiments.

In accordance with an aspect of the disclosure, a method of configuring a positioning reference signal (PRS) in a telecommunication system is provided. The method includes the operations of providing a plurality of PRS configurations in the form of a plurality of comb patterns, selecting one of the plurality of PRS configurations and applying it for transmission of PRS, determining a muting configuration periodicity, T_REP, on the basis of the selected one of the plurality of PRS configuration, and selectively muting PRS according to T_REP.

In an embodiment, each of the plurality of PRS configurations in the form of a plurality of comb patterns is defined in terms of one or more resource elements which comprise a PRS transmission.

In an embodiment, the plurality of PRS configurations comprise one or more of Comb-1, Comb-3, Comb-4, Comb-6 and Comb-12 patterns.

In an embodiment, T_REP is determined on the basis of a set of all possible values.

In an embodiment, a location server configures the value of T_REP.

In an embodiment, T_REP is additionally defined on the basis of numerology.

In accordance with another aspect of the disclosure, a method of configuring a positioning reference signal (PRS) in a telecommunication system comprising the operation of muting PRS for at least a part of a frequency band is provided.

In an embodiment, muting is configured for a part of the frequency band or the entire frequency band.

In an accordance with another aspect of the disclosure, a method of configuring a positioning reference signal (PRS) in a telecommunication system comprising the method of the first aspect combined with the method of the second aspect is provided.

In accordance with another aspect of the disclosure, a non-transitory data carrier carrying processor control code to implement the method of any preceding aspect is provided.

In accordance with another aspect of the disclosure, apparatus arranged to perform the method of any of the first, second or third aspects is provided.

Before undertaking the DETAILED DESCRIPTION below, it may be advantageous to set forth definitions of certain words and phrases used throughout this patent document the terms "include" and "comprise," as well as derivatives thereof, mean inclusion without limitation, the term "or," is inclusive, meaning and/or, the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like, and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
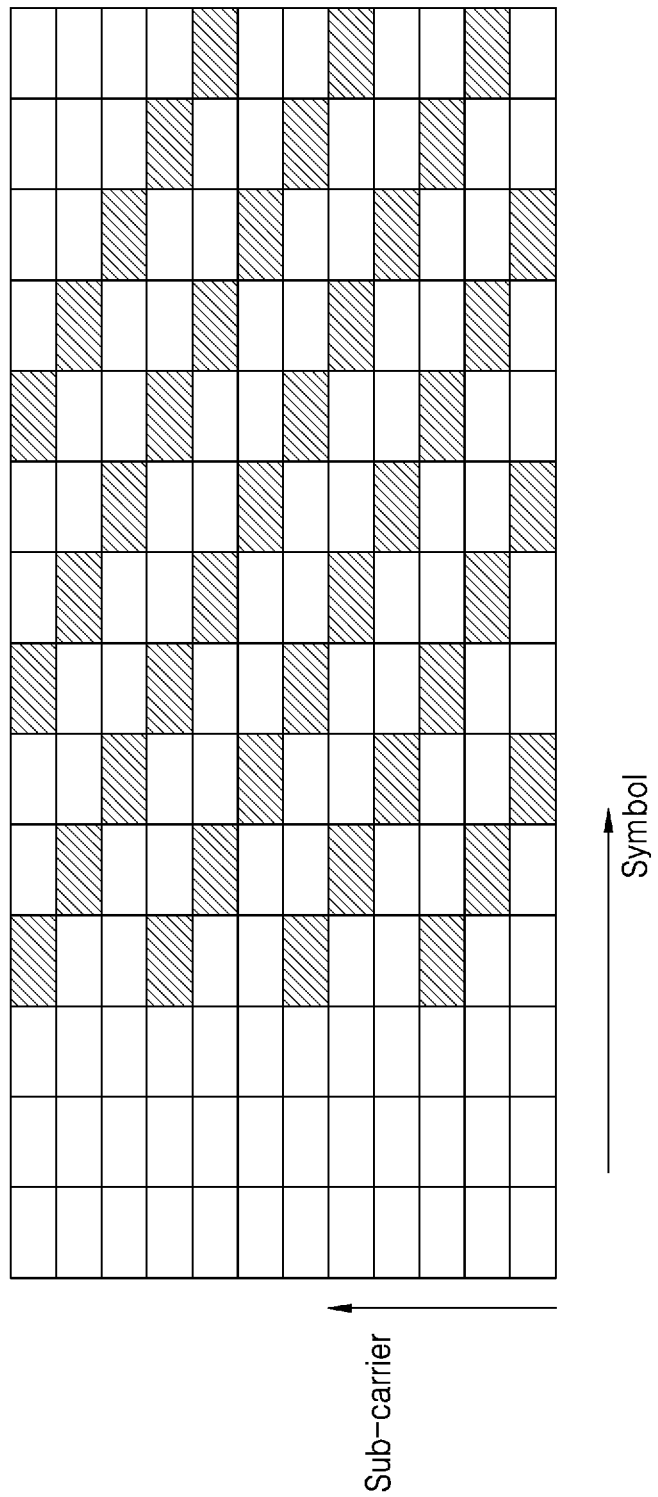
FIGS. 1A, 1B, and 1C show Comb-3, Comb-6 and Comb-12 patterns respectively, according to various embodiments of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

FIGS. 1A to 1C, and 2 to 6, discussed below, and the various embodiments used to describe the principles of the disclosure in this patent document are by way of illustration only and should not be construed in any way to limit the scope of the disclosure. Those skilled in the art will understand that the principles of the disclosure may be implemented in any suitably arranged system or device.

The disclosure relates to improvements is the provision, management and interpretation of a positioning reference signal in a telecommunication system and apparatus associated therewith. It applies particularly to New Radio (NR) or Fifth Generation (5G) systems, but may have other applications.

Demand for mobile services is exploding and one of the fastest growing segments is Location Based Services (LBS), primarily driven by two major requirements: emergency services and commercial applications. In response to these needs, second and third generation networks (Wideband Code Division Multiple Access (WCDMA), Global System for Mobile Communications (GSM), Code Division Multiple Access (CDMA)) have added support for several positioning technologies, which vary in their accuracy and Time to First Fix (TTFF) performance. 3GPP Release 9 for LTE defines support for positioning technologies: Extended Cell ID (ECID), Assisted Global Navigation Satellite System (A-GNSS), Observed Time Different Of Arrival (OTDOA) and LTE Positioning Protocol (LPP), a new positioning protocol. A reference signal, i.e., positioning reference signal (PRS) has been defined in LTE. Further in Rel-11, Uplink Observed Time Different of Arrival (UOTDA) has been adopted using SRS measurement. 3GPP Rel-15 defines support for some Radio Access Technology (RAT)-independent positioning techniques, such as Real Time Kinematic (RTK) GNSS, to improve the accuracy of LTE positioning.

In LTE, base stations (eNBs) can be configured for time-based blanking, called "PRS muting". By this process, when a strong PRS signal is muted, weak PRS signals from the neighbouring cells are more easily detected by the UE.

In LTE, PRS muting configuration is defined with a periodic sequence with periodicity T_REP, where T_REP counts the number of positioning occasions and it can be 2, 4, 8 and 16. The muting info is represented by a binary string of length 2, 3, 8 and 16 bits.

The disclosure addresses issues in the related art, whether mentioned herein or not and provides an improved positioning reference capability in a telecommunication system.

According to the disclosure there is provided an apparatus and method as set forth in the appended claims. Other features of the disclosure will be apparent from the dependent claims, and the description which follows.

According to a first aspect of the disclosure, there is provided a method of configuring a positioning reference signal (PRS) in a telecommunication system comprising the operations of: providing a plurality of PRS configurations in the form of a plurality of comb patterns; selecting one of the plurality of PRS configurations and applying it for transmission of PRS; determining a muting configuration periodicity, T_REP, on the basis of the selected one of the plurality of PRS configuration; and selectively muting PRS according to T_REP.

In an embodiment, each of the plurality of PRS configurations in the form of a plurality of comb patterns is defined in terms of one or more resource elements which comprise a PRS transmission.

In an embodiment, the plurality of PRS configurations comprise one or more of Comb-1, Comb-3, Comb-4, Comb-6 and Comb-12 patterns.

In an embodiment, T_REP is determined according to the Table 1.

TABLE 1

|      | Comb-1   | Comb-3  | Comb-4  | Comb-6  | Comb-12 |
|------|----------|---------|---------|---------|---------|
| "00" | 16 (k1)  | 4 (k2)  | 6 (k3)  | 2 (k4)  | 2 (k5)  |
| "01" | 32 (2k1) | 8 (2k2) | 12 (2k3)| 4 (2k4) | 4 (2k5) |
| "10" | 64 (4k1) | 16 (4k2)| 24 (4k3)| 8 (4k4) | 8 (4k5) |
| "11" | 128 (8k1)| 32 (8k2)| 48 (8k3)| 16 (8k4)|         |

In an embodiment, T_REP is determined on the basis of a set of all possible values.

In an embodiment, a location server configures the value of T_REP.

In an embodiment, T_REP is additionally defined on the basis of numerology.

According to a second aspect of the disclosure, there is provided method of configuring a positioning reference signal (PRS) in a telecommunication system comprising the operation of muting PRS for at least a part of a frequency band.

In an embodiment, muting is configured for a part of the frequency band or the entire frequency band.

According to a third aspect of the disclosure, there is provided a method of configuring a positioning reference signal (PRS) in a telecommunication system comprising the method of the first aspect combined with the method of the second aspect.

According to a fourth aspect of the disclosure, there is provided a non-transitory data carrier carrying processor control code to implement the method of any preceding aspect.

According to a fifth aspect of the disclosure, there is provided apparatus arranged to perform the method of any of the first, second or third aspects.

Although a few preferred embodiments of the disclosure have been shown and described, it will be appreciated by those skilled in the art that various changes and modifications might be made without departing from the scope of the disclosure, as defined in the appended claims.

Figure 1B:
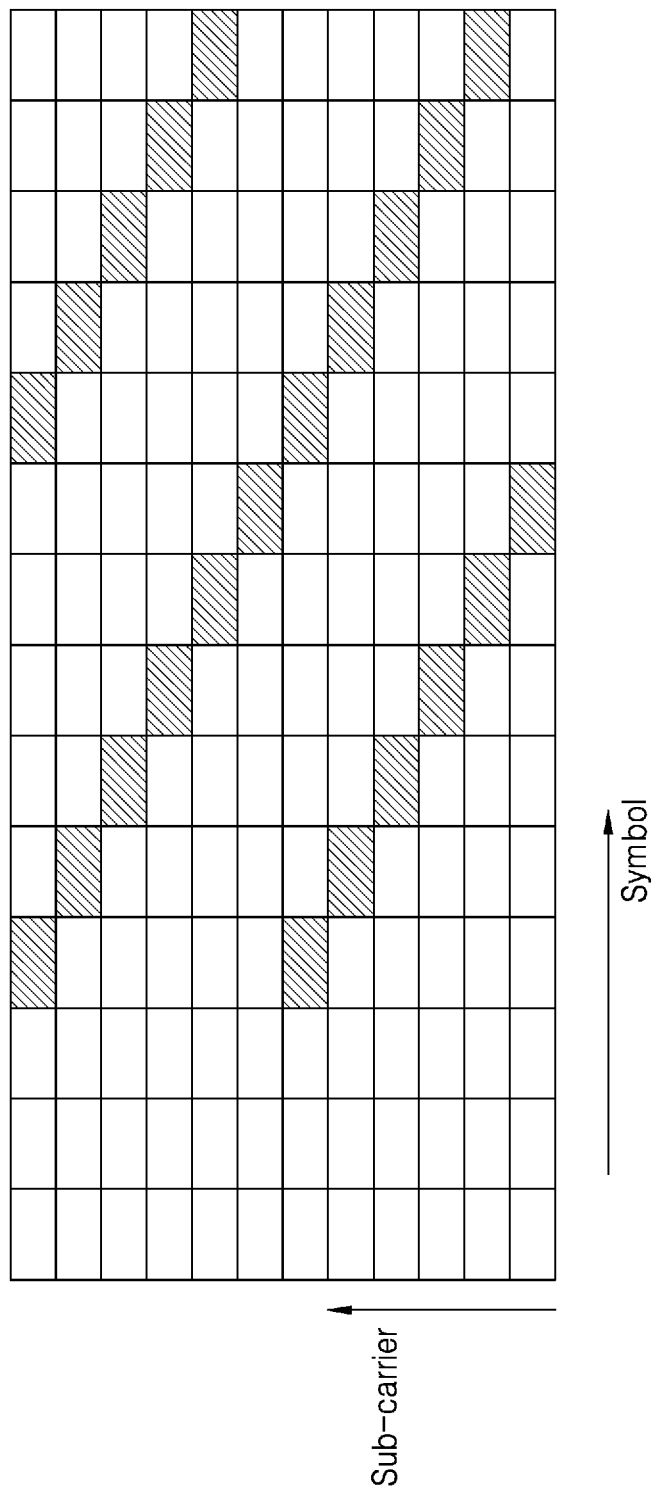
Figure 1C:
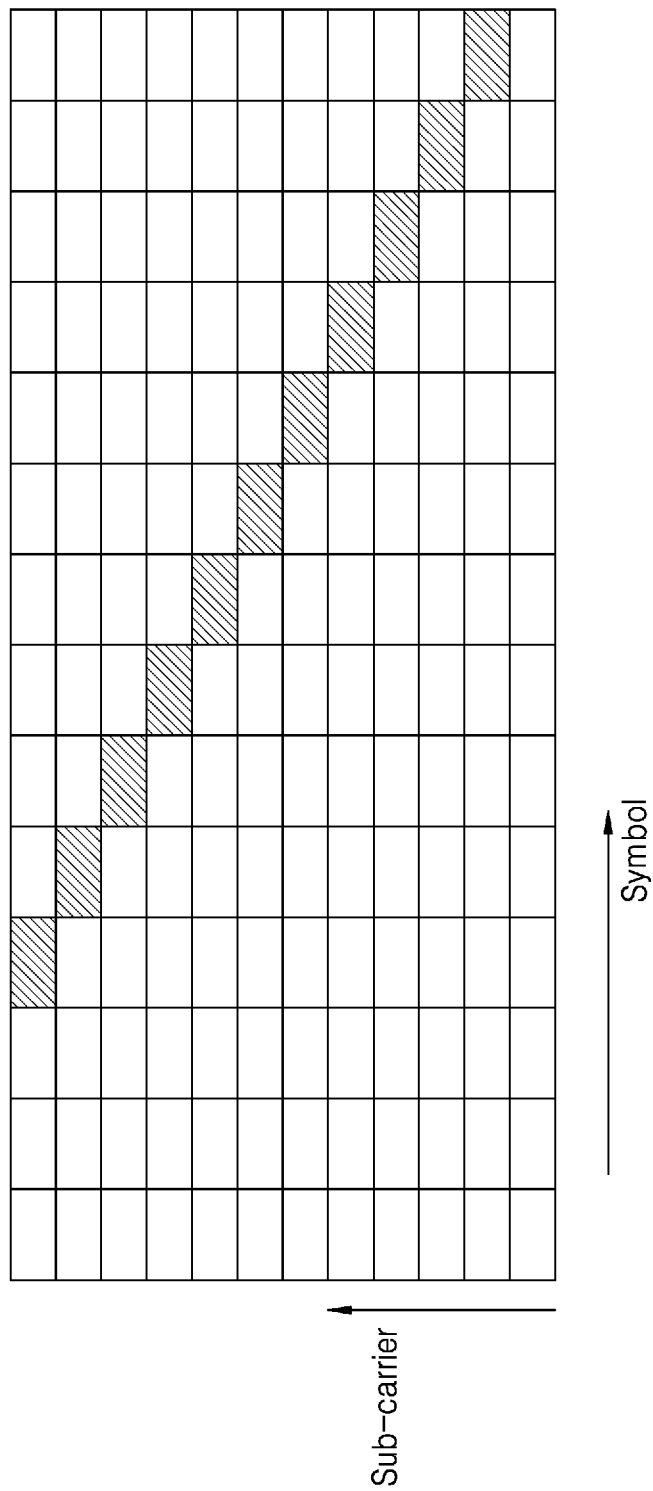

For a better understanding of the disclosure, and to show how embodiments of the same may be carried into effect, reference will now be made, by way of example only, to the accompanying diagrammatic drawings in which:

FIGS. 1A to 1C show Comb-3, Comb-6 and Comb-12 patterns respectively, according to various embodiments of the disclosure.

In NR, a PRS muting configuration should be different from LTE for at least the following reasons. In LTE, only one comb pattern, i.e., comb6 is supported, but in NR multiple PRS patterns with different comb patterns, e.g., comb-1,2, 3, 4, 6, 12, are supported. Further, multiple numerologies are supported in NR. Still further, system bandwidth can be much larger, up to 400 MHz in FR2. All of these considerations lead to a need for a different PRS muting configuration.

In LTE, muting configuration is relevant across multiple positioning occasions. However, in NR, which can utilise beamforming, even in one positioning occasion, muting can be configured.

For example, if a serving base station (gNB) has K beams and does beam sweeping in one positioning occasion to transmit PRS, k out of K beams can be muted to reduce the interference to other neighbouring gNBs. The muting configuration of multiple gNBs can be coordinated by the location server of the system. One positioning occasion can consist of multiple PRS resource sets and beam sweeping can be conducted within each resource set or across multiple resource sets. The muting can happen within one resource set or across multiple resource sets. In this sense, it is necessary to define the measurement behaviour of a UE in the system.

When a UE detects a Downlink (DL) PRS resource(s)/resource set which is different from the one indicated by the network and chooses to use such resource(s)/resource set as the reference, it should report the resource identifier(s) (ID(s)) and/or resource set ID.

The indicated resource(s)/resource set is normally from the serving cell. However, when muting happens, the serving cell might be muted and UE has to choose resource(s)/resource set from a neighboring cell. In such a case, the decision criterion of the UE should be defined for such an operation. Several alternatives can be considered:

1: UE may choose a DL PRS resource with a strongest first detected path;

2: UE may choose a DL PRS resource with a strongest detected path;

3: UE may choose a DL PRS resource with the strongest average paths;

4: a combination of 1-3 above.

The criterion used should also be reported to the network to facilitate the positioning.

Another issue is how resource ID(s) and/or resource set ID are reported. Three cases may be considered.

In a first case, both resource ID and resource set ID are defined globally. In a second case, resource ID is defined locally but resource set ID is defined globally. In a third case, both resource ID and resource set ID are defined locally.

For the first case, the UE can report resource ID or resource set ID only without any ambiguity.

For the second case, reporting resource ID only is not enough because the same ID might be used in different resource sets so that both resource ID and resource set ID should be reported.

For the third case, even with both resource ID and resource set ID being reported, ambiguity may still exist and in such a case, the cell ID should also be reported to resolve any such ambiguity.

Alternatively, other IDs, e.g., PRS sequence ID, where cell ID is implicitly included, can be reported instead. It is also possible to report PRS sequence ID only without resource ID/resource set ID because such IDs can be included in 'cinit' (a seed used to generate PRS) when generating PRS sequences. Reporting sequence ID can implicitly report resource ID/resource set ID.

In LTE, comb pattern based muting may be used, but only comb-6 is supported. However, according to an embodiment of the disclosure, other comb patterns such as comb-3 and comb-12 can be used. Comb-3, Comb-6 and Comb-12 patterns are illustrated in FIGS. 1A to 1C respectively. Each of these shows PRS transmissions within a time domain slot, comprising 14 symbols and 12 subcarriers, as shown by the axes on FIG. 1A. The PRS transmission is indicated by the shaded resource element (cell).

With a larger comb pattern, such as comb-12 (see FIG. 1C), more cells can transmit orthogonal PRS at the same time. There is an offset between different cells and there is less collision between PRS from neighbouring cells. In this sense, for the same number of cells transmitting PRS, a lower number of positioning occasions are needed. For example, for 24 cells with Physical Cell ID, PCI 0-23, if comb-12 is used, two positioning occasions are required to orthogonalize cell 0-11 and cell 12-23. This requires muting of certain PRS transmissions so that cell orthogonality can be achieved.

If comb-6 is used, four positioning occasions are required to orthogonalize cell 0-5, cell 6-11, cell 12-17, and cell 18-23.

If comb-3 is used, 8 positioning occasions are required to orthogonalize cell 0-2, cell 3-5, cell 6-8, cell 9-11, cell 12-14, cell 15-17, cell 18-20, cell 21-23.

For comb-1, 24 occasions are required to orthogonalize all the PRS from 24 cells. Therefore, muting configuration periodicity, T_REP, is defined to depend on comb-pattern. In other words, embodiments of the disclosure define a muting scheme, including periodicity, based on which PRS comb pattern is used.

Therefore, two different ways to define T_REP with comb-pattern may be defined as follows.

In a first instance, for each adopted comb-pattern, an individual group of T_REP values is defined. For example, for comb-6, T_REP as well as the bit string length belongs to the set {2, 4, 8, 16}. For comb-12, T_REP belongs to the set {2, 4, 8}. For comb-3, T_REP belongs to the set {4, 8, 16, 32}. For comb-1, T_REP belongs to the set {16, 32, 64, 128}. For comb-4, T_REP belongs to the set {6, 12, 24, 48}. It should be noted that the values in the set are just examples and they can be either pre-defined or configured in a dynamic or semi-persistent way. The table below indicates the actual value of T_REP based on different comb patterns, where k1 to k5 are the basic/smallest T_REP values and they can either be pre-defined or configured in dynamic or semi-persistent way, by means of high layer signalling (such as radio resource control (RRC), LPP) as indicated by the code in the first column of the Table 2.

TABLE 2

| | Comb-1 | Comb-3 | Comb-4 | Comb-6 | Comb-12 |
|---|---|---|---|---|---|
| "00" | 16 (k1) | 4 (k2) | 6 (k3) | 2 (k4) | 2 (k5) |
| "01" | 32 (2k1) | 8 (2k2) | 12 (2k3) | 4 (2k4) | 4 (2k5) |
| "10" | 64 (4k1) | 16 (4k2) | 24 (4k3) | 8 (4k4) | 8 (4k5) |
| "11" | 128 (8k1) | 32 (8k2) | 48 (8k3) | 16 (8k4) | |

In a second instance, it is possible to define a super set containing all T_REP values. For example, it can be {2, 4, 8, 16, 32, 64, 128, 6, 12, 24, 48} and it is up to the location server to configure such values as required.

In LTE, a single numerology is supported but in NR, multiple numerologies are supported. For a different numerology, a slot duration is different and the duration of one positioning occasion could either be the same or different.

If the duration of one positioning occasion is the same for different numerologies and the muting pattern is used across different muting occasions, T_REP may not depend on numerologies, i.e., the value set of T_REP is the same for all numerologies.

However, if the duration of one positioning occasion is different for different numerologies, different values sets of T_REP should be defined on a per numerology basis. One example can be as below.

15 kHz: T_REP C {2, 4, 8, 16}
30 kHz: T_REP C {4, 8, 16, 32}
60 kHz: T_REP C {8, 16, 32, 64}
120 kHz: T_REP C {16, 32, 64, 128}

It should be noted the values above are just examples and not intended to be limiting.

In LTE, muting is only possible in the time domain. However, in NR, the system bandwidth can be up to 400 MHz. If time domain muting happens, the entire bandwidth needs to be muted and this can be considered a waste of resources. In such a case, embodiments of the disclosure introduce frequency domain muting as well as time domain muting.

Figure 2:
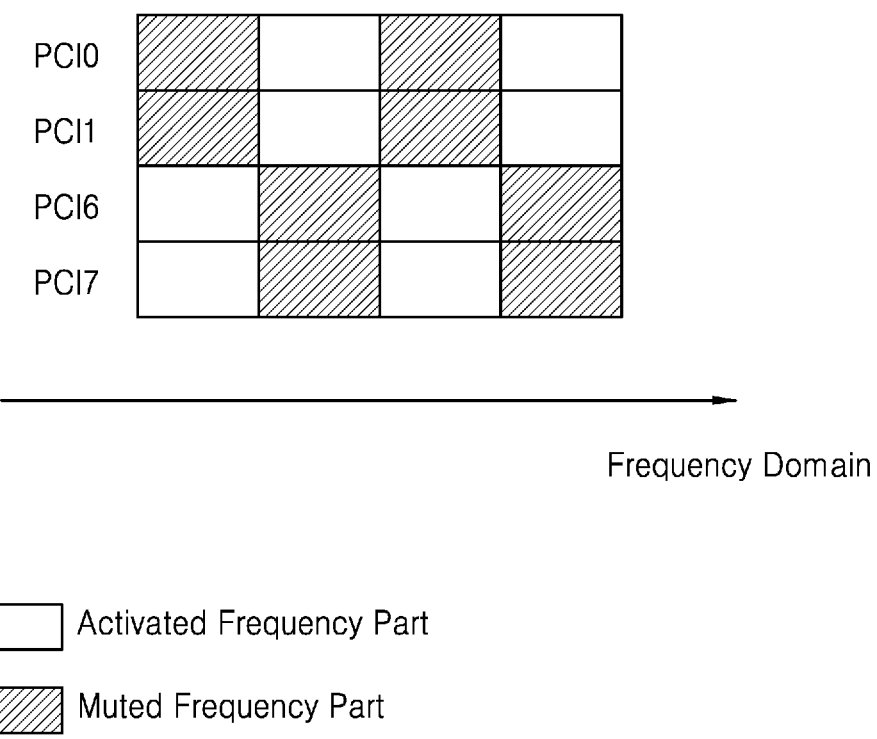
FIG. 2 shows frequency muting according to an embodiment of the disclosure.

This is illustrated in FIG. 2. FIG. 2 shows frequency muting according to an embodiment of the disclosure.

Referring to FIG. 2, this shows that for a comb-6 pattern, PCI 0 and PCI 6 will overlap so they may be orthogonalized by frequency muting. In other words, PCI 0 is muted in the frequency domain while PCI 6 is active and vice-versa.

The following parameters may be defined for frequency domain muting: Basic frequency part W_b; Entire frequency band W_e; a string to indicate the muted and activated frequency parts.

In the example shown in FIG. 2, for PCI 0 and 1, the string is 1010 (where '1' indicates an activated frequency part and '0' indicates a muted frequency part) and for PCI 6 and 7, the string is 0101. It should be noted that frequency muting can be used alone or if combined with time domain muting, it can orthogonalize PRS transmissions from a greater number of cells.

Figure 3:
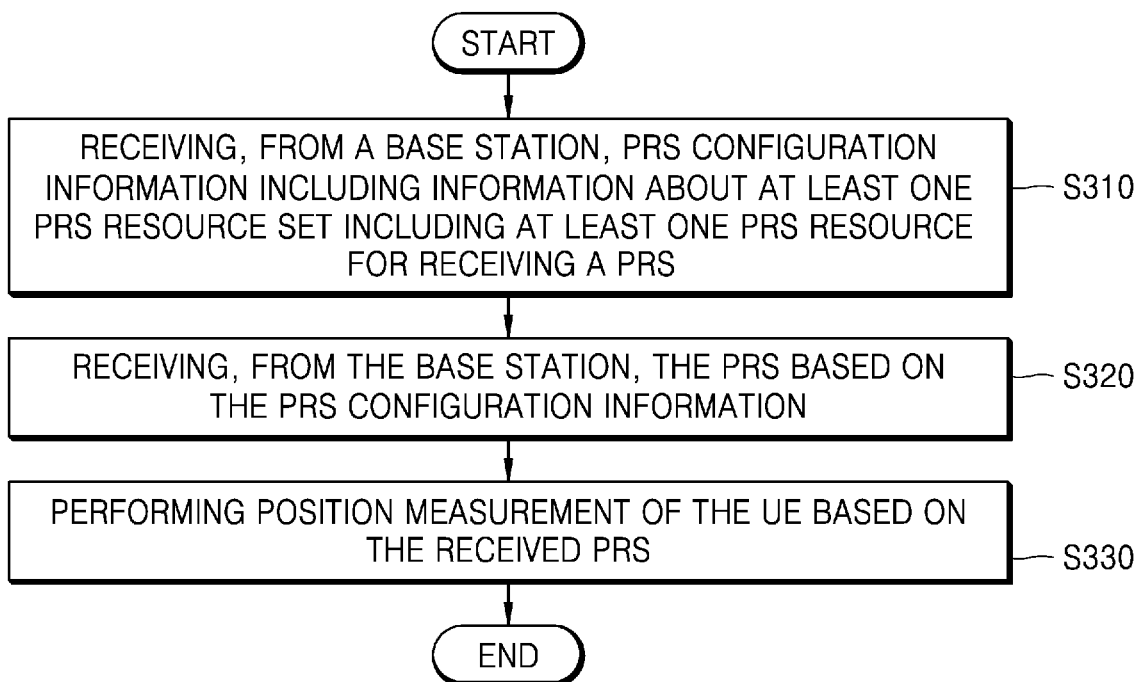
FIG. 3 illustrates a flowchart of a method of measuring a position of user equipment (UE) performed by the UE in a wireless communication network according to an embodiment of the disclosure.

FIG. 3 illustrates a flowchart of a method of measuring a position of user equipment (UE) performed by the UE in a wireless communication network according to an embodiment of the disclosure.

Since the details have been described above, repeated description will be omitted.

Referring to FIG. 3, at operation S310, the UE may receive, from a base station, positioning reference signal (PRS) configuration information including information about at least one PRS resource set including at least one PRS resource for receiving a PRS.

The PRS configuration information may include PRS muting pattern information indicating a muting pattern indicating a PRS resource that is not transmitted in at least one PRS resource set.

In an embodiment, the PRS muting pattern information may include at least one of first pattern information or second pattern information. The first pattern information may indicate that at least one PRS resource included in one PRS resource set is muted. The second pattern information may indicate that at least one PRS resource included in each of the plurality of PRS resource sets is muted.

In an embodiment, the UE may identify at least one PRS resource that PRS is not received, based on the PRS muting pattern information. At this time, the UE may receive the PRS from the base station based on the identification result.

In an embodiment, the PRS muting pattern information may include information of muting period determined based on a resource pattern. The UE may identify at least one PRS resource that PRS is not received in consideration of the information of muting period determined based on the resource pattern. For example, the resource pattern may correspond to the above-described comb-pattern.

In an embodiment, the PRS muting pattern information may include information of muting period determined based on numerology of the PRS resource which the PRS is transmitted. The UE may identify at least one PRS resource that PRS is not received in consideration of the information of muting period determined based on the numerology of the PRS resource which the PRS is transmitted.

In an embodiment, in a case that same frequency resource for transmitting the PRS is allocated to a plurality of cells, the UE may identify at least one PRS resource that the PRS is not received, based on the PRS muting pattern information determined to mute frequency resource of at least one cell among the plurality of cells.

In an embodiment, the PRS muting pattern information may be received by a higher layer signal.

At operation S320, the UE may receive, from the base station, the PRS based on the PRS configuration information.

At operation S330, the UE may perform position measurement of the UE based on the received PRS.

Figure 4:
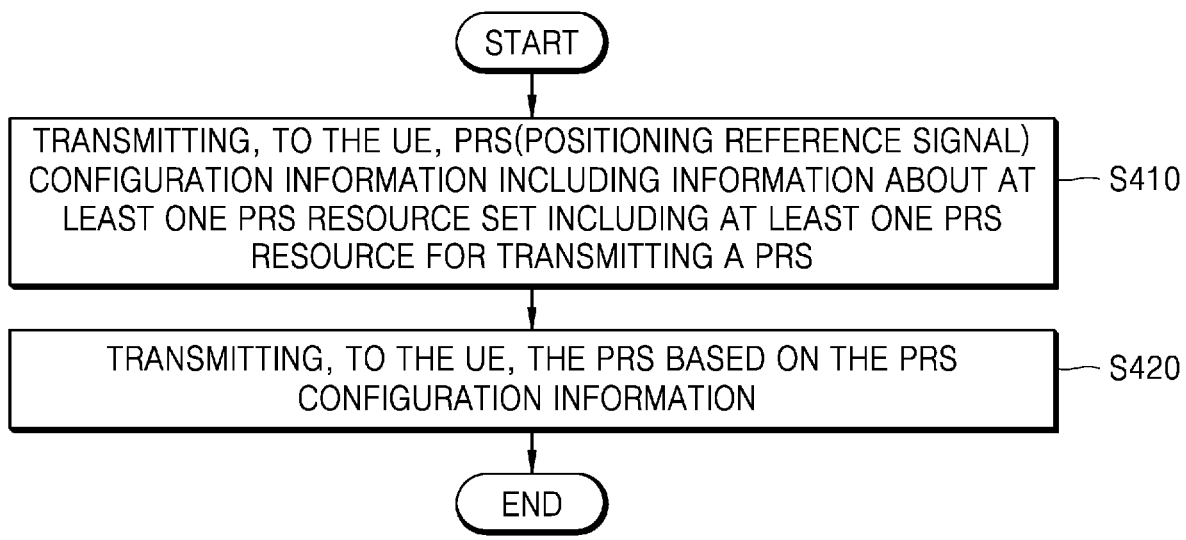
FIG. 4 illustrates a flowchart of a method for measuring a position of user equipment (UE) performed by a base station in a wireless communication network according to an embodiment of the disclosure.

FIG. 4 illustrates a flowchart of a method for measuring a position of user equipment (UE) performed by a base station in a wireless communication network according to an embodiment of the disclosure.

Since the details have been described above, repeated description will be omitted.

Referring to FIG. 4, at operation S410, the base station may transmit, to the UE, (PRS) configuration information including information about at least one PRS resource set including at least one PRS resource for transmitting a PRS.

As mentioned above, the PRS configuration information may include PRS muting pattern information indicating a muting pattern indicating a PRS resource that is not transmitted in at least one PRS resource set.

As mentioned above, the PRS muting pattern information may include first pattern information indicating that at least one PRS resource included in one PRS resource set is muted and second pattern information indicating that at least one PRS resource included in each of the plurality of PRS resource sets is muted.

At operation S420, the base station may transmit, to the UE, the PRS based on the PRS configuration information.

Figure 5:
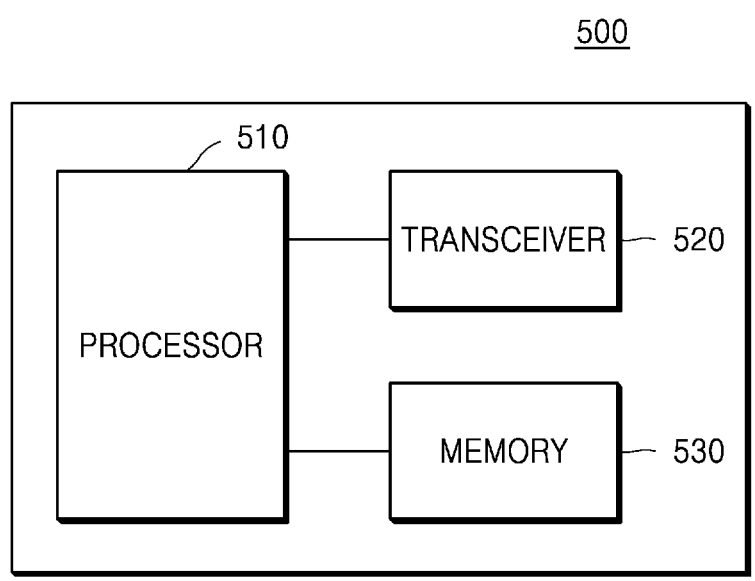
FIG. 5 schematically illustrates the base station according to an embodiment of the disclosure.

FIG. 5 schematically illustrates the base station according to an embodiment of the disclosure.

Referring to FIG. 5, the Base station 500 may include a processor 510, a transceiver 520 and a memory 530. However, all of the illustrated components are not essential. The Base station 500 may be implemented by more or less components than those illustrated in FIG. 5. In addition, the processor 510 and the transceiver 520 and the memory 530 may be implemented as a single chip according to another embodiment.

The aforementioned components will now be described in detail.

The processor 510 may include one or more processors or other processing devices that control the proposed function, process, and/or method. Operation of the Base station 500 may be implemented by the processor 510.

The transceiver 520 may include a RF transmitter for up-converting and amplifying a transmitted signal, and a RF receiver for down-converting a frequency of a received signal. However, according to another embodiment, the transceiver 520 may be implemented by more or less components than those illustrated in components.

The transceiver 520 may be connected to the processor 510 and transmit and/or receive a signal. The signal may include control information and data. In addition, the transceiver 520 may receive the signal through a wireless channel and output the signal to the processor 510. The transceiver 520 may transmit a signal output from the processor 510 through the wireless channel.

The memory 530 may store the control information or the data included in a signal obtained by the Base station 500. The memory 530 may be connected to the processor 510 and store at least one instruction or a protocol or a parameter for the proposed function, process, and/or method. The memory 530 may include read-only memory (ROM) and/or random access memory (RAM) and/or hard disk and/or CD-ROM and/or DVD and/or other storage devices.

Figure 6:
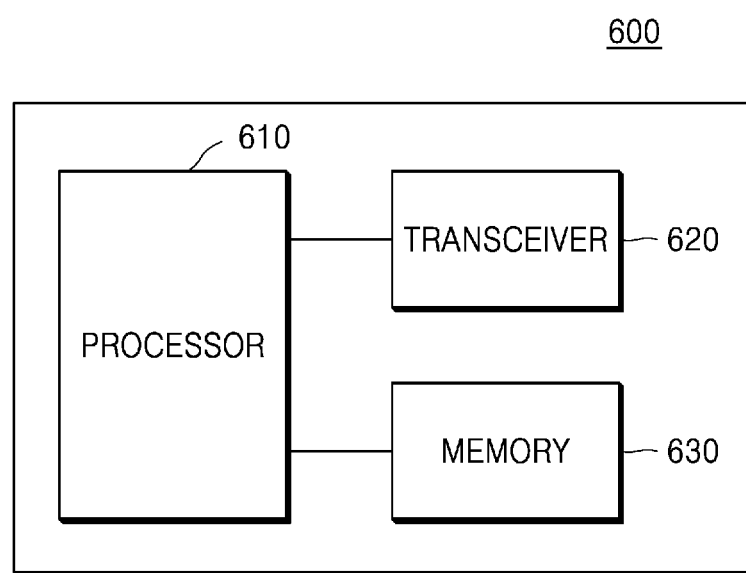
FIG. 6 illustrates a user equipment (UE) according to an embodiment of the disclosure.

FIG. 6 illustrates a user equipment (UE) according to an embodiment of the preset disclosure.

Referring to FIG. 6, the UE 600 may include a processor 610, a transceiver 620 and a memory 630. However, all of the illustrated components are not essential. The UE 600 may be implemented by more or less components than those illustrated in FIG. 6. In addition, the processor 610 and the transceiver 620 and the memory 630 may be implemented as a single chip according to another embodiment.

The aforementioned components will now be described in detail.

The processor 610 may include one or more processors or other processing devices that control the proposed function, process, and/or method. Operation of the UE 600 may be implemented by the processor 610.

The transceiver 620 may include a RF transmitter for up-converting and amplifying a transmitted signal, and a RF receiver for down-converting a frequency of a received signal. However, according to another embodiment, the transceiver 620 may be implemented by more or less components than those illustrated in components.

The transceiver 620 may be connected to the processor 610 and transmit and/or receive a signal. The signal may include control information and data. In addition, the transceiver 620 may receive the signal through a wireless channel and output the signal to the processor 610. The transceiver 620 may transmit a signal output from the processor 610 through the wireless channel.

The memory 630 may store the control information or the data included in a signal obtained by the UE 600. The memory 630 may be connected to the processor 610 and store at least one instruction or a protocol or a parameter for the proposed function, process, and/or method. The memory 630 may include read-only memory (ROM) and/or random access memory (RAM) and/or hard disk and/or CD-ROM and/or DVD and/or other storage devices.

In an embodiment, the processor configured to: receive, from a base station, positioning reference signal (PRS) configuration information including information about at least one PRS resource set including at least one PRS resource for receiving a PRS, receive, from the base station, the PRS based on the PRS configuration information and perform position measurement of the UE based on the received PRS.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the operations of any method or process so disclosed, may be combined in any combination, except combinations where at least some of such features and/or operations are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of measuring a position of user equipment (UE), the method being performed by the UE in a wireless communication network and comprising:
    receiving, from a base station, positioning reference signal (PRS) configuration information including information about at least one PRS resource set for receiving a PRS, wherein each of the at least one PRS resource set includes at least one PRS resource;
    identifying whether PRS muting configuration information is identified according to a second option among two options based on the PRS configuration information, wherein a time location to be muted is identified as one PRS resource set and all PRS resources within the one PRS resource set are muted in a case that the PRS muting configuration information is identified according to a first option, and wherein the time location to be muted is identified as one PRS resource within a PRS resource set in a case that the PRS muting configuration information is identified according to the second option;
    in response to the PRS muting configuration information being identified as according to the second option, identifying one PRS resource within the PRS resource set as the time location to be muted and PRS resources other than the time location to be muted within the PRS resource set as resources for receiving the PRS; and
    receiving, from the base station, the PRS based on the resources for receiving the PRS.

2. The method of claim 1, wherein the time location to be muted is not used for transmitting the PRS by the base station.

3. The method of claim 2, further comprising:
    identifying the at least one PRS resource that is not received, based on the PRS muting configuration information,
    wherein the receiving, from the base station, of the PRS comprises receiving the PRS based on an identification result.

4. The method of claim 3, wherein the PRS muting configuration information includes information of a muting period determined based on a resource pattern.

5. The method of claim 3, wherein the PRS muting configuration information includes information of a muting period determined based on numerology of the PRS resource which the PRS is transmitting.

6. The method of claim 3, wherein the identifying of the at least one PRS resource that is not received, based on the PRS muting configuration information, comprises:
in a case that a same frequency resource for transmitting the PRS is allocated to a plurality of cells, identifying the at least one PRS resource that is not received, based on the PRS muting configuration information determined to mute a frequency resource of at least one cell among the plurality of cells.

7. The method of claim 1, wherein the PRS muting configuration information is received by a higher layer signal.

8. A method of measuring a position of user equipment (UE), the method performed by a base station in a wireless communication network and comprising:
transmitting, to the UE, positioning reference signal (PRS) configuration information including information about at least one PRS resource set for transmitting a PRS, wherein each of the at least one PRS resource set includes at least one PRS resource;
identifying whether PRS muting configuration information is identified according to a second option among two options based on the PRS configuration information, wherein a time location to be muted is identified as one PRS resource set and all PRS resources within the one PRS resource set are muted in a case that the PRS muting configuration information is identified according to a first option, and wherein the time location to be muted is identified as one PRS resource within a PRS resource set in a case that the PRS muting configuration information is identified according to the second option;
in response to the PRS muting configuration information being identified as according to the second option, identifying one PRS resource within the PRS resource set as the time location to be muted and PRS resources other than the time location to be muted within the PRS resource set as resources for transmitting the PRS; and
transmitting, to the UE, the PRS based on the resources for transmitting the PRS.

9. The method of claim 8, wherein the time location to be muted is not used for transmitting the PRS to the UE.

10. A user equipment (UE) for measuring a position in a wireless communication network, the UE comprising:
a transceiver;
a memory storing at least one instruction; and
a processor configured to:
receive, from a base station, positioning reference signal (PRS) configuration information including information about at least one PRS resource set for receiving a PRS, wherein each of the at least one PRS resource set includes at least one PRS resource,
identify whether PRS muting configuration information is identified according to a second option among two options based on the PRS configuration information, wherein a time location to be muted is identified as one PRS resource set and all PRS resources within the one PRS resource set are muted in a case that the PRS muting configuration information is identified according to a first option, and wherein the time location to be muted is identified as one PRS resource within a PRS resource set in a case that the PRS muting configuration information is identified according to the second option,
in response to the PRS muting configuration information being identified as according to the second option, identify one PRS resource within the PRS resource set as the time location to be muted and PRS resources other than the time location to be muted within the PRS resource set as resources for receiving the PRS, and
receive, from the base station, the PRS based on the resources for receiving the PRS.

11. The UE of claim 10, wherein the time location to be muted is not used for transmitting the PRS by the base station.

12. The UE of claim 10, wherein the PRS muting configuration information is received by a higher layer signal.

* * * * *